United States Patent
Agamy et al.

(10) Patent No.: US 9,525,355 B2
(45) Date of Patent: Dec. 20, 2016

(54) DIRECT CURRENT ELECTRIC POWER SYSTEMS AND METHOD OF OPERATING THE SAME

(71) Applicant: General Electric Company, Schenectady, NY (US)

(72) Inventors: Mohammed Agamy, Niskayuna, NY (US); Herman Lucas Norbert Wiegman, Niskayuna, NY (US); Rui Zhou, Niskayuna, NY (US); Andrew William Berner, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 76 days.

(21) Appl. No.: 14/669,207

(22) Filed: Mar. 26, 2015

(65) Prior Publication Data

US 2016/0285374 A1 Sep. 29, 2016

(51) Int. Cl.
*H02M 3/335* (2006.01)

(52) U.S. Cl.
CPC ................. *H02M 3/33507* (2013.01)

(58) Field of Classification Search
CPC .... H02M 3/337; H02M 3/3356; H02M 7/797; H02J 1/102
USPC ........... 363/16–17, 21.02, 65, 56.08, 95, 98; 307/66, 82
See application file for complete search history.

(56) References Cited

U.S. PATENT DOCUMENTS

| | | | |
|---|---|---|---|
| 5,656,915 A | 8/1997 | Eaves | |
| 6,281,485 B1* | 8/2001 | Siri | G05F 1/67 126/601 |
| 7,282,814 B2 | 10/2007 | Jacobs | |
| 7,450,401 B2* | 11/2008 | Iida | H02J 7/022 363/16 |
| 7,502,242 B2* | 3/2009 | Iida | H02M 7/797 363/95 |
| 7,986,535 B2* | 7/2011 | Jacobson | H02M 1/34 363/17 |

(Continued)

FOREIGN PATENT DOCUMENTS

WO    2014070998 A1    5/2014

OTHER PUBLICATIONS

Du, Yang, and DD-C. Lu. "Analysis of a battery-integrated boost converter for module-based series connected photovoltaic system." Power Electronics Conference (IPEC), 2010 International. IEEE, 2010.

(Continued)

*Primary Examiner* — Rajnikant Patel
(74) *Attorney, Agent, or Firm* — Francis T. Coppa (57) ABSTRACT

A converter system includes a power converter including a first bridge circuit including at least one first switching device. The power converter also includes a second bridge circuit magnetically coupled to the first bridge circuit. The second bridge circuit includes at least one second switching device. The converter system also includes a plurality of first conductors of opposing polarities coupled to the first bridge circuit. The converter system further includes a plurality of second conductors of opposing polarities. At least one second conductor of the plurality of second conductors is coupled to the second bridge circuit. The converter system also includes a third conductor coupled to one first conductor of the plurality of first conductors and coupled to the second bridge circuit.

27 Claims, 6 Drawing Sheets

(56) References Cited

U.S. PATENT DOCUMENTS

| | | |
|---|---|---|
| 8,304,110 B2 | 11/2012 | Vallance et al. |
| 8,330,299 B2 | 12/2012 | Steigerwald et al. |
| 8,406,025 B1 | 3/2013 | Alexander |
| 8,410,634 B2 | 4/2013 | Park |
| 8,765,275 B2 | 7/2014 | Mahalingam et al. |
| 8,811,039 B2 * | 8/2014 | The Ngo ........... H02M 3/33584 363/21.02 |
| 2004/0125618 A1 | 7/2004 | De Rooij et al. |
| 2011/0052968 A1 | 3/2011 | Venkataramani et al. |
| 2012/0033466 A1 | 2/2012 | Moussaoui |
| 2014/0038038 A1 | 2/2014 | Vallance et al. |
| 2014/0178791 A1 | 6/2014 | Vallance et al. |
| 2014/0186684 A1 | 7/2014 | Rijssenbeek et al. |

OTHER PUBLICATIONS

Agamy, Mohammed, et al. "A transformer-less partial power boost converter for PV applications using a three-level switching cell." Applied Power Electronics Conference and Exposition (APEC), 2013 Twenty-Eighth Annual IEEE. IEEE, 2013.

* cited by examiner

DIRECT CURRENT ELECTRIC POWER SYSTEMS AND METHOD OF OPERATING THE SAME

BACKGROUND

The field of the disclosure relates generally to direct current (DC) electric power systems and, more particularly, to apparatus and methods for processing electric power from a battery system through a series-connected power converter.

At least some known direct current (DC) electric power systems include batteries for power storage and at least one DC load bus for powering DC loads such as motors and lighting. Many of these known DC power systems include DC-DC converters coupled to the batteries and DC load buses to facilitate controlled battery charging and discharging. Moreover, many of these known DC systems transmit DC to inverter devices that convert DC power to alternating current (AC) power to power AC loads.

Some of the known DC power systems include a plurality of batteries in multiple parallel-connected battery strings that are dissimilar due to ageing, battery cell failures and jumping, different vendors, models, and ratings. As such, each string will behave differently from the other strings, thereby increasing the necessary observation and maintenance. Such divergence of battery strings is particularly important to sodium chemistry batteries due to some of the unique characteristics of such batteries.

Known DC-DC converters that perform buck and boost of the voltages between the batteries and DC load buses process 100% of the energy transferred therebetween. As such, the converters are necessarily large for industrial facilities. Also, such converters may need to be individually designed and operated due to the differences between the battery strings and the common voltages of the DC load buses. Therefore, many known DC electric power systems with multiple parallel-connected battery strings are expensive to construct, operate, and maintain with a number of unique electrical parameters that facilitate increasing the complexity of such systems.

BRIEF DESCRIPTION

In one aspect, a converter system is provided. The converter system includes a power converter including a first bridge circuit including at least one first switching device. The power converter also includes a second bridge circuit magnetically coupled to the first bridge circuit. The second bridge circuit includes at least one second switching device. The converter system also includes a plurality of first conductors of opposing polarities coupled to the first bridge circuit. The converter system further includes a plurality of second conductors of opposing polarities. At least one second conductor of the plurality of second conductors is coupled to the second bridge circuit. The converter system also includes a third conductor coupled to one first conductor of the plurality of first conductors and coupled to the second bridge circuit.

In a further aspect, a direct current (DC) electrical power system is provided. The DC electrical power system includes a plurality of rechargeable DC storage devices a plurality of DC-to-DC converter systems. Each DC-to-DC converter system of the plurality of DC-to-DC converter systems is coupled to a respective rechargeable DC storage device of the plurality of rechargeable DC storage devices. Each DC-to-DC converter system includes a DC-to-DC converter including a first bridge circuit including at least one first switching device and a second bridge circuit magnetically coupled to the first bridge circuit. The second bridge circuit includes at least one second switching device. Each DC-to-DC converter system also includes a plurality of first conductors of opposing polarities coupled to the first bridge circuit and a plurality of second conductors of opposing polarities. At least one second conductor of the plurality of second conductors is coupled to the second bridge circuit. Each DC-to-DC converter system further includes a third conductor coupled to one first conductor of the plurality of first conductors and coupled to the second bridge circuit.

In another aspect, a method of operating a direct current (DC) electrical power system is provided. The method includes transmitting a first portion of electric power between a rechargeable DC storage battery and a DC bus through a DC-to-DC converter, thereby converting the first portion of electric power. The DC-to-DC converter includes a first bridge circuit and a second bridge circuit magnetically coupled to the first bridge circuit. The method also includes transmitting a second portion of electric power between a first electrically conductive element extending between the rechargeable DC storage battery and the first bridge circuit to the second bridge circuit through a second electrically conductive element, thereby augmenting the converted first portion of electric power with the non-converted second portion of electric power.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processing device, cause the processing device to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The direct current (DC) power systems described herein facilitate use of more efficient and cheaper power converters with a smaller footprint. Specifically, the power converters described herein facilitate converting only a fraction of the electric power transferred between a battery and a DC bus and facilitating the majority of the power to bypass the power converter. Therefore, the size of the converters is reduced and lower power losses due to decreased power that is actually converted result in a greater efficiency. In addition, the DC power systems described herein include power converters that overcome issues associated with dissimilar batteries in multiple parallel-connected battery strings that are dissimilar due to ageing, battery cell failures and jumping, different vendors, models, and ratings. As such, each string will behave less differently from the other strings. Furthermore, each of the individual power converters are integrated into a common battery management system, thereby further facilitating decreasing aggregated installation costs.

Figure 1:
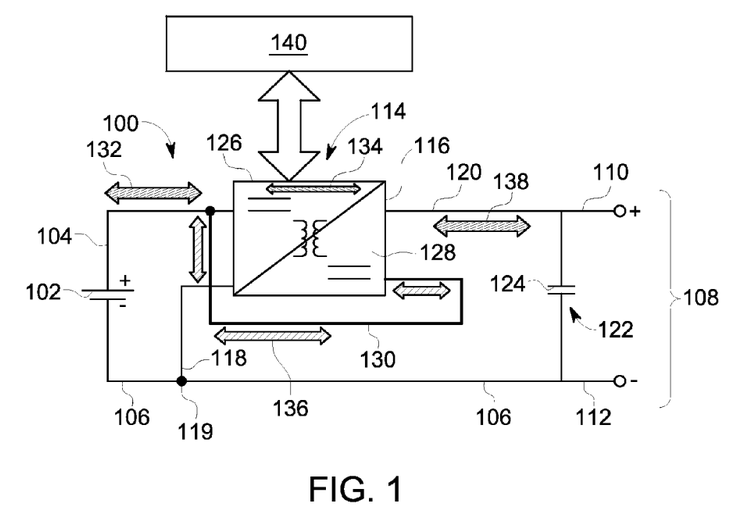
FIG. 1 is schematic view of an exemplary direct current (DC) power system.

FIG. 1 is schematic view of an exemplary direct current (DC) power system 100. DC power system 100 includes a DC storage device, i.e., in the exemplary embodiment, a bi-directional storage battery system 102. Alternatively, any DC storage device that enables operation of DC power system 100 as described herein is used, including, without limitation, solar arrays and momentum storage devices, i.e., flywheels. DC power system 100 also includes a first positive DC conductor 104 coupled to battery system 102 and a first negative DC conductor 106 coupled to battery system 102.

DC power system 100 further includes a DC bus system 108 that includes a positive polarity bus 110 and a negative polarity bus 112. Alternatively, DC bus system 108 includes any number of positive polarity buses 110 and negative polarity buses 112, and any number of DC loads (none shown) that enable operation of DC power system 100 as described herein.

DC power system 100 also includes a converter system 114 that includes a power converter 116. Power converter 116 is coupled to battery system 102 through first positive DC conductor 104 and a second negative DC conductor 118 coupled to first negative DC conductor 106 at a negative terminal 119. Power converter 116 is coupled to DC bus system 108 through a second positive DC conductor 120 and first negative DC conductor 106. Second positive DC conductor 120 and first negative DC conductor 106 are coupled to positive polarity bus 110 and negative polarity bus 112, respectively, through a DC link 122 that includes any number of capacitive devices 124 that enable operation of DC power system 100 as described herein.

Power converter 116 includes a first bridge circuit 126 and a second bridge circuit 128 magnetically coupled to first bridge circuit 126. In the exemplary embodiment, power converter 116 is a bi-directional DC-to-DC converter and converter system 114 is a partial-power dual-active bridge (sometimes referred to as "full-bridge") system configured to regulate power transmission therethrough by regulating phase shifting between first bridge circuit 126 and second bridge circuit 128. Alternatively, first bridge circuit 126 and second bridge circuit 128 define any bi-directional partial power bridge system topology that enables operation of power converter 116 and converter system 114 as described herein, including, without limitation, an H-bridge topology, a half-bridge topology, and single-switch topologies including, without limitation, a single-ended primary-inductor topology and a Ćuk topology. Converter system 114 further includes an augmenting conductor 130 coupled to first positive DC conductor 104 and second bridge circuit 128.

DC power system 100 further includes a control system 140 that includes sufficient computer-readable/executable instructions, data structures, program modules, and program sub-modules, to receive data associated with measured values within DC power system 100 and from other power systems and other control systems to facilitate command generation that enables operation of DC power system 100 as described herein. For example, and without limitation, control system 140 facilitates actively driving both first bridge circuit 126 and second bridge circuit 128.

In operation, battery current 132 is transmitted either to or from battery system 102 during battery charging and battery discharging, respectively. A first current, i.e., power converter current 134 is transmitted through first bridge circuit 126 and second bridge circuit 128. A second current, i.e., augmenting current 136 is transmitted between first positive DC conductor 104 and second bridge circuit 128 through augmenting conductor 130. DC bus current 138 is transmitted between power converter 116 and DC bus system 108. Augmenting current 136 is greater than power converter current 134. Therefore, a majority of battery current 132 and DC bus current 138 is transmitted through augmenting conductor 130.

Figure 2:
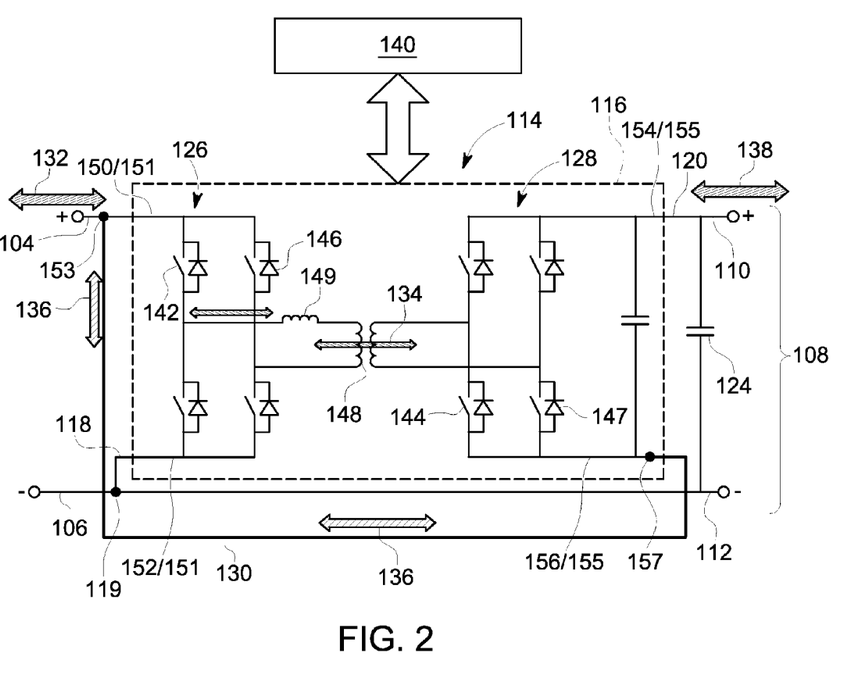
FIG. 2 is a schematic view of an exemplary power converter that may be used with the DC power system shown in FIG. 1.

FIG. 2 is a schematic view of power converter 116 that may be used with DC power system 100 (shown in FIG. 1) and converter system 114. First bridge circuit 126 includes a plurality of first switching devices 142 and second bridge circuit 128 includes a plurality of second switching devices 144. Switching devices 142 and 144 are any semiconductor-based switching devices that enable operation of power converter 116 as described herein, including, and without limitation, insulated-gate bipolar transistors (IGBTs) and thyristor-based devices. Each of switching devices 142 and 144 is coupled in parallel to an anti-paralleling diode 146 and 147, respectively. First bridge circuit 126 and second bridge circuit 128 each include any number of switching devices 142 and 144, respectively, and any number of anti-paralleling diodes 146 that enable operation of power converter 116 as described herein. First bridge circuit 126 is magnetically coupled to second bridge circuit 128 through an isolation transformer 148. An inductive device 149 is coupled to first bridge circuit 126 and isolation transformer 148 to facilitate regulation of phase-shifting between first bridge circuit 126 and second bridge circuit 128.

Also, in the exemplary embodiment, power converter 116 includes a plurality of first conductors 151 of opposing polarities, i.e., a first positive polarity conductor 150 and a first negative polarity conductor 152 coupled to first bridge circuit 126. First positive polarity conductor 150 is coupled to first positive DC conductor 104 and augmenting conductor 130 at a positive terminal 153. Also, power converter 116 includes a plurality of second conductors 155 of opposing polarities, i.e., a second positive polarity conductor 154 and a second negative polarity conductor 156 coupled to second bridge circuit 128. Second negative polarity conductor 156 is coupled to augmenting conductor 130 at a negative terminal 157.

In operation, and referring to FIGS. 1 and 2, when battery system 102 is discharging and supplying power to DC bus system 108, second switching devices 144 in second bridge circuit 128 are held open through control system 140. In some embodiments, second switching devices 144 are either closed or switched to facilitate current flow through second bridge circuit 128 by bypassing diodes 144. Also, first switching devices 142 in first bridge circuit 126 are either closed or switched under control of control system 140. Battery current 132 is transmitted from battery system 102 to converter system 114 and current 132 is divided at positive terminal 153 into power converter current 134 and augmenting current 136. Augmenting current 136 bypasses first bridge circuit 126 through augmenting conductor 130. Specifically, augmenting current 136 is transmitted through augmenting conductor 130 from first positive polarity conductor 150 through positive terminal 153 to second negative polarity conductor 156 through negative terminal 157. Augmenting current 136 is transmitted through diodes 147 from second negative polarity conductor 156 to second positive polarity conductor 154.

In addition, power converter current 134 is transmitted from first positive polarity conductor 150 through first switching devices 142 of first bridge circuit 126 to second bridge circuit 128 through isolation transformer 148. First switching devices 142 and inductive device 149 facilitate phase shifting of power converter current 134. The output voltage at second bridge circuit 128 is the sum of voltages from converted output, i.e., the voltage induced by first bridge circuit 126 and isolation transformer 148, and the voltage induced through augmenting conductor 130. In addition, power converter current 134 and augmenting current 136 are summed within second bridge circuit 128, where most of the power associated with DC bus current 138 is transmitted through augmenting conductor 130. Therefore, augmenting current 136 augments power converter current 134. Since, during battery discharging operation, augmenting current 136 and power converter current 134 as well as the voltage induced by first bridge circuit 126 onto second bridge circuit 128 and the voltage induced through augmenting conductor 130 are summed at second positive polarity conductor 154, a power converter positive polarity output transmission path between battery system 102 and DC bus system 108 is defined. As such, a positive output leg connection with respect to second bridge circuit 128 is defined.

DC bus current 138 is further transmitted to second positive DC conductor 120 and DC bus system 108. During such discharging operation of battery system 102, converted power, i.e., power converter current 134 provides the small boost of voltage to close the difference between battery voltage and converter output voltage. Therefore, power converter 116 only transmits a small portion of power to boost the voltage up to the difference between battery system 102 and second positive DC conductor 120. If battery voltage and converter output voltage are substantially similar, little to no current is transmitted through power converter 116 and substantially all power is transmitted through augmenting conductor 130. As such, power converter 116 does not need to be sized to carry the full current draw by DC bus system 108 from battery system 102.

Further, in operation, when battery system 102 is charging through DC bus system 108, switching devices 144 in second bridge circuit 128 are closed through control system 140. In some embodiments, second switching devices 144 are switched to facilitate current flow through second bridge circuit 128. Also, switching devices 142 in first bridge circuit 126 are either closed or switched under control of 140. DC bus current 138 is transmitted from DC bus system 108 to converter system 114 and current 138 is divided at transformer 148 into power converter current 134 and augmenting current 136. Augmenting current 136 bypasses first bridge circuit 126 through augmenting conductor 130. Specifically, augmenting current 136 is transmitted through augmenting conductor 130 as current 136 is transmitted from second negative polarity conductor 156 through negative terminal 157 to first positive polarity conductor 150 through positive terminal 153.

In addition, power converter current 134 is transmitted from second positive polarity conductor 154 through second switching devices 144 of second bridge circuit 128 through isolation transformer 148. Either first switching devices 142 or second switching devices 144 and inductive device 149 facilitate phase shifting of power converter current 134. Some current 134 may transmit through diodes 146.

The output voltage at first positive polarity conductor 150 is the sum of voltages from converted output, i.e., the voltage induced by first bridge circuit 126 and the voltage induced through augmenting conductor 130. In addition, power converter current 134 and augmenting current 136 are summed at positive terminal 153, where most of the power associated with battery current 132 is transmitted through augmenting conductor 130. Therefore, augmenting current 136 augments power converter current 134. Since, during battery charging operation, augmenting current 136 and power converter current 134 as well as the voltage induced by first bridge circuit 126 and the voltage induced through augmenting conductor 130 are summed at first positive polarity conductor 150, a power converter positive polarity output transmission path between DC bus system 108 and battery system 102 is defined. As such, a positive output leg connection with respect to second bridge circuit 128 is defined.

Battery current 132 is further transmitted to first positive DC conductor 104 and battery system 102. During such charging operation of battery system 102, converted power, i.e., power converter current 134 provides the small boost of voltage to close the difference between battery voltage and converter output voltage. Therefore, power converter 116 only transmits a small portion of power to boost the voltage up to the difference between battery system 102 and first positive DC conductor 104. If battery voltage and converter output voltage are substantially similar, little to no current is transmitted through power converter 116 and substantially all power is transmitted through augmenting conductor 130. As such, power converter 116 does not need to be sized to carry the full current draw by battery system 102 from DC bus system 108. As such, converter system 114 is configured to facilitate feed-forward bypass current transmission and small boosting during both charging and discharging operations.

Figure 3:
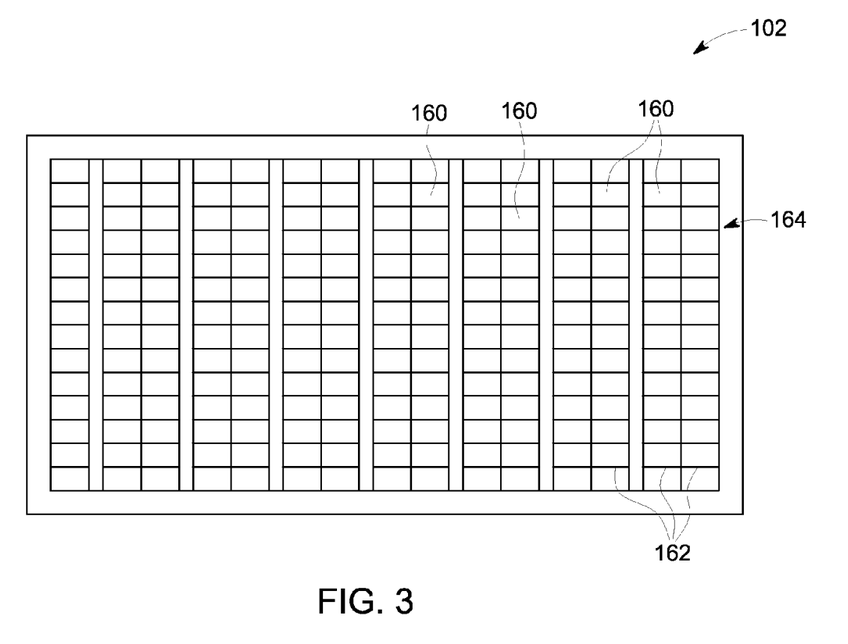
FIG. 3 is a schematic view of an exemplary battery system that may be used with the DC power system shown in FIG. 1.

FIG. 3 is a schematic view of battery system 102 that may be used with DC power system 100 (shown in FIG. 1). In the exemplary embodiment, battery system 102 includes a plurality of electrochemical cells 160. Cells 160 are electrically coupled to each other in at least one of series, parallel, and a combination of series and parallel arrangements. The number of cells 160 and their electrical arrangement, typically, depend on the output requirement of battery system 102, and on the end use application. Cells 160 are stacked adjacent to each other and each cell 160 has an outer surface 162, a portion of which is in contact with adjacent cells 160. Each cell 160 is electrically isolated from adjacent cells 160 by a high-temperature electrically insulating coating 164, applied to outer surface 162 of each cell 160 or on at least one facing surface 162.

Moreover, in the exemplary embodiment of battery system 102, each cell 160 is substantially similar to each other cell 160. Alternatively, a first portion of cells 160 has at least one characteristic rating value different from a characteristic rating value of a second portion of cells 160. Such characteristic ratings include, for example, and without limitation, charging and discharging rates, ability to hold a charge, and fully-charged voltage values.

Figure 4:
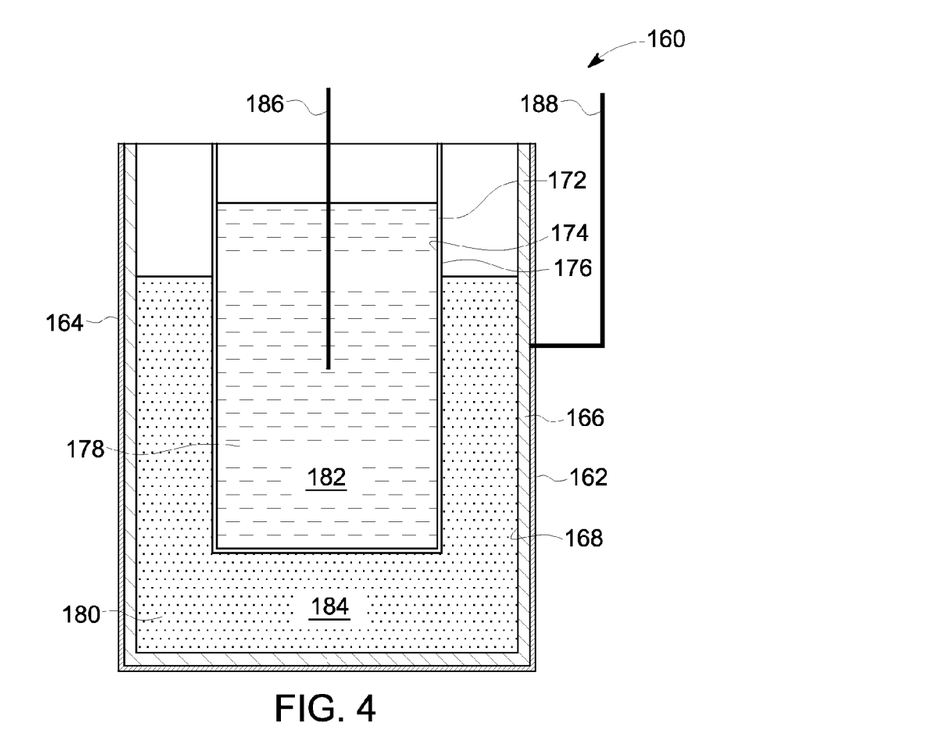
FIG. 4 is a schematic view of an exemplary electrochemical cell that may be used with the battery system shown in FIG. 3.

FIG. 4 is a schematic view of electrochemical cell 160 that may be used with battery system 102 (shown in FIG. 3). Electrochemical cell 160 includes a metallic casing 166 including an inner surface 168 and outer surface 162. Suitable metallic materials for metallic casing 166 include, without limitation, nickel, mild steel, stainless steel, nickel-coated steel, molybdenum, and molybdenum-coated steel.

Cell 160 further includes a separator 172 including a first surface 174 and a second surface 176. Separator 172 is characterized by a selected ionic conductivity and is fabricated from an alkali metal ion conductor solid electrolyte that conducts alkali metal ions during use. Suitable materials for separators 172 include, without limitation, alkali-metal-beta'-alumina, alkali-metal-beta''-alumina, alkali-metal-beta'-gallate, and alkali-metal-beta''-gallate. First surface 174 defines at least a portion of a first chamber 178, and second surface 176 defines a second chamber 180 between inner surface 168 of casing 166 and second surface 176 of separator 172. First chamber 178 is disposed within second chamber 180 and first chamber 178 is in ionic communication with second chamber 180 through separator 172. Outer surface 162 of metallic casing 166 is coated with high-temperature, electrically-insulating coating 164. Coating 164 facilitates electrically isolating each individual electrochemical cell 160 from an adjacent cell 160.

In the exemplary embodiment, electrochemical cell 160 is a sodium metal halide cell. First chamber 178 contains a cathodic material 182 and second chamber 180 contains an anodic material 184. Cathodic material 182 exists in one of elemental form or as a salt, depending on a state of charge. Cathodic material 182 may contain an alkali metal, and the salt form of cathodic material 182 is a halide. Suitable materials for use as cathodic material 182 include, without limitation, aluminum, nickel, zinc, copper, chromium, tin, arsenic, tungsten, molybdenum, iron, and various combinations thereof. The halide of the alkali metal may be one of, without limitation, chlorine, fluorine, bromine, iodine, and various combinations thereof. Anodic material 184 is sodium that generates alkali metal ions that are transported across separator 176 from first chamber 178 to second chamber 180 during battery charging operation and from second chamber 180 to first chamber 178 during battery discharge operation. Anodic material 184 is molten during use.

Electrochemical cell 160 also includes a first, i.e., cathode current collector 186 at least partially disposed within first chamber 178 and a second, i.e., anode current collector 188 electrically coupled to second chamber 180, where both current collectors 186 and 188 collect current produced by electrochemical cell 160. Cathode current collector 186 is in electrical communication with cathodic material 182, and anode current collector 188 is in electrical communication with anodic material 184 through metallic casing 166. Suitable materials for anode current collector 188 include, without limitation, tungsten, titanium, nickel, copper, carbon, molybdenum, and combinations of two or more thereof. Cathode current collector 186 is formed from materials that include, without limitation, platinum, palladium, gold, nickel, copper, carbon, and titanium.

Alternative embodiments of battery system 102 and electrochemical cells 160 include, without limitation, lead-acid cells, sodium-sulfur cells, magnesium-antimony cells, lead-antimony cells, lithium-based cells, and potassium-based cells. Also, for those embodiments of DC power system 100 that include more than one battery system 102, a plurality of battery technologies may be used.

Figure 5:
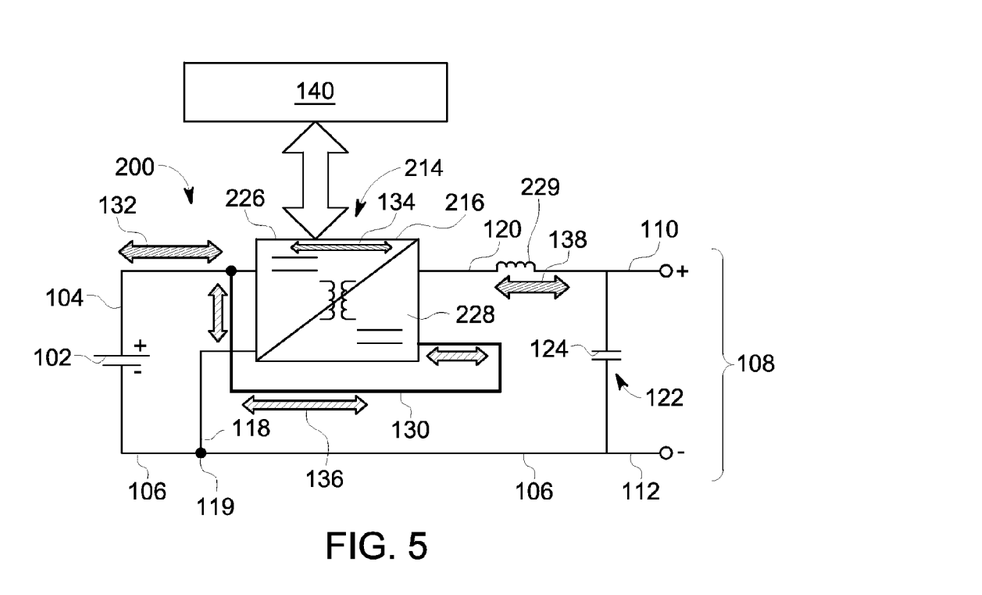
FIG. 5 is schematic view of an alternative DC power system.

FIG. 5 is schematic view of an alternative DC power system 200. DC power system 200 is similar to DC power system 100 (shown in FIG. 1) with the differences set forth below. In this alternative embodiment, DC power system 200 includes a converter system 214 that includes a power converter 216. Power converter 216 includes a first bridge circuit 226 and a second bridge circuit 228 magnetically coupled to first bridge circuit 226. Power converter 216, first bridge circuit 226, and second bridge circuit 228 and the differences from power converter 116, first bridge circuit 126, and second bridge circuit 128, respectively, are discussed below.

DC power system also includes an inductive device 229 coupled to second bridge circuit 228 through second positive DC conductor 120. Inductive device 229 acts as a current source at the output of second bridge circuit 228 to facilitate regulating DC bus current 138 that is transmitted to DC bus system 108 from power converter 216. The voltage of DC bus system 108 can be decreased to a value lower than that of battery system 102 as necessary.

Figure 6:
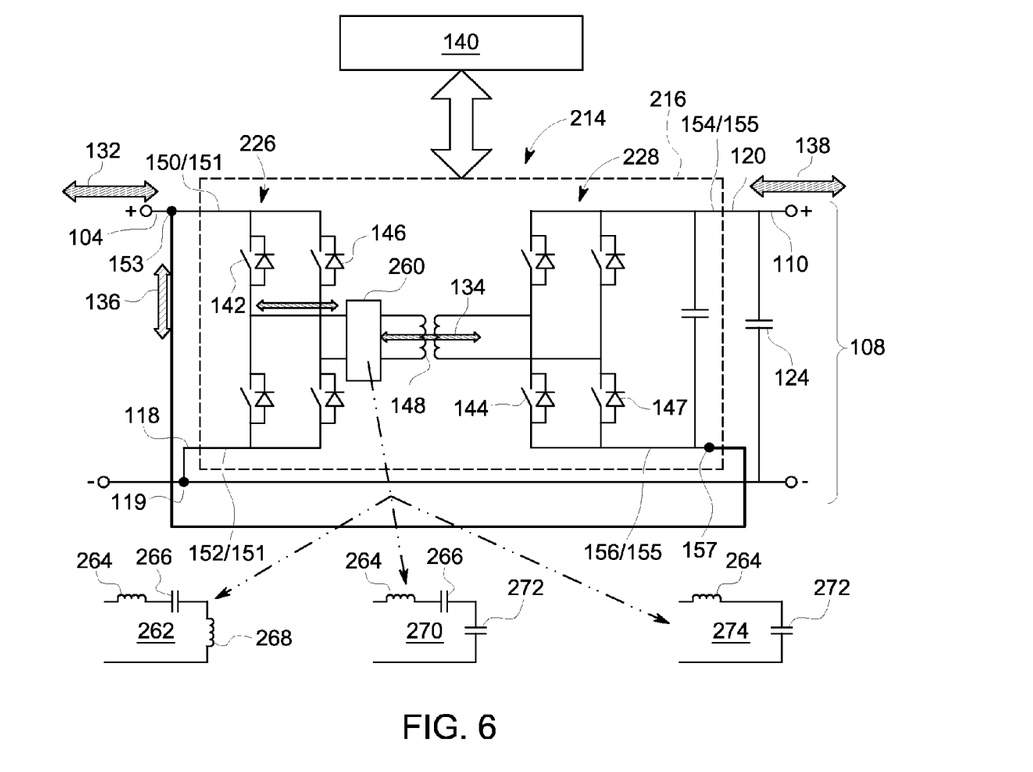
FIG. 6 is a schematic view of an alternative power converter that may be used with the DC power system shown in FIG. 3.

FIG. 6 is a schematic view of alternative power converter 216 that may be used with DC power system 200 (shown in FIG. 5). Power converter 226 is similar to power converter 116 (shown in FIG. 1) with the differences set forth below. In this alternative embodiment, power converter 216 includes a first bridge circuit 226 that is similar to first bridge circuit 126 with a resonant tank circuit 260 coupled to isolation transformer 148. Tank circuit 260 facilitates soft switching of power converter 226 through phase shifting such that switching transitions occur under more favorable conditions, i.e., when switching devices 142 have electrical conditions such as voltage or current close to zero.

Three examples of resonant tank circuit 260 are shown in FIG. 6. A first resonant tank circuit 262 includes a first inductive device 264, a first capacitive device 266, and a second inductive device 268 coupled in series. A second resonant tank circuit 270 includes first inductive device 264, first capacitive device 266, and a second capacitive device 272 coupled in series. A third resonant tank circuit 274 includes first inductive device 264 and second capacitive device 272 coupled in series. Alternatively, any configuration of resonant tank circuit 260 that enables operation of power converter 216 as described herein is used.

Figure 7:
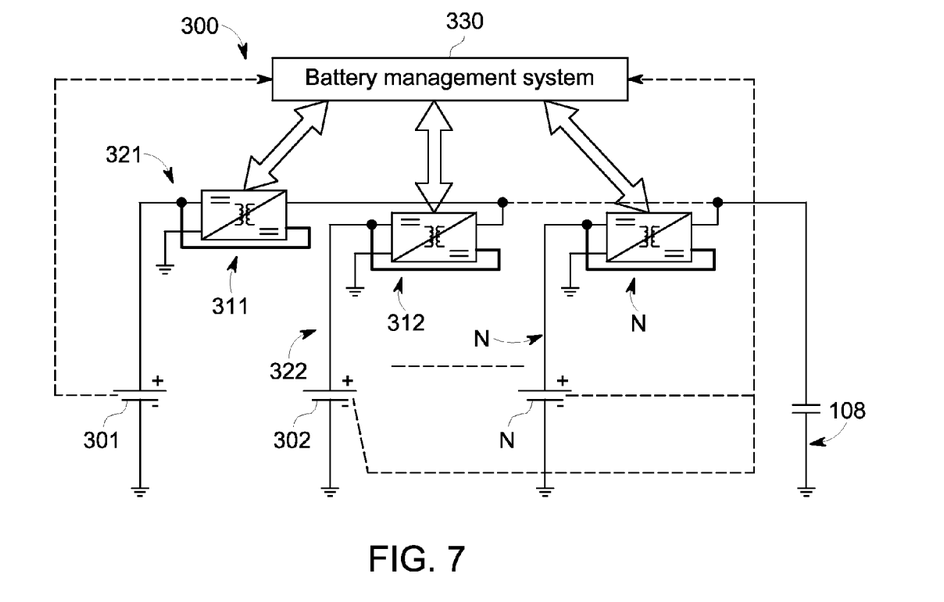
FIG. 7 is a schematic view of another alternative DC power system.

FIG. 7 is a schematic view of another alternative DC power system 300. DC power system 300 includes a plurality of DC storage devices, i.e., battery systems 301, 302, through N. In the exemplary embodiment, a portion of battery systems 301, 302, through N are substantially similar to battery system 102 (shown in FIG. 3) and a portion of systems 301, 302, through N are not similar to battery system 102. Alternatively, all of battery systems 301, 302, through N are substantially similar or at least partially dissimilar.

DC power system 300 also includes a plurality of DC-to-DC converter systems 311, 312, through N that are substantially similar to either of converter systems 114 and 214 (shown in FIGS. 2 and 6, respectively). Battery systems 301, 302, through N are coupled to converter systems 311, 312, through N, respectively, to define a plurality of parallel battery and power conversion strings 321, 322, and N, respectively. DC power system 300 further includes DC bus system 108 coupled to and powered from battery and power conversion strings 321, 322, and N.

DC power system 300 also includes a battery management system 330 that receives inputs from battery systems 301, 302, through N, e.g., and without limitation, battery voltages and currents and individual cell voltages. Battery management system 330 also receives inputs from, and transmits commands to, DC-to-DC converter systems 311, 312, through N to facilitate matching voltage outputs of systems 311, 312, and N to DC bus system 108 and levelizing to facilitate current transmission through systems 311, 312, and N. In the exemplary embodiment, battery management system 330 is a stand-alone system configured to control each and all of battery and power conversion strings 321, 322, and N. Alternatively, battery management system 330 is part of a larger control suite and integrated therein, e.g., and without limitation, a control system that also controls load management on DC bus system 108.

DC power system 300 with individual converter systems 311, 312, through N for each of battery systems 301, 302, through N, respectively, facilitates mixing different battery technologies and ratings and compensate for changes in any of the battery systems 301, 302, through N by adjusting the voltages and/or the currents in the respective battery and power conversion strings 321, 322, and N relative to the others in DC power system 300. Also, DC power system 300 facilitates removing one or more of battery and power conversion strings 321, 322, and N from service while maintaining the desired functionality of DC bus system 108. Further, DC power system 300 facilitates providing makeup power for those strings 321, 322, and N removed from service through remaining in-service strings 321, 322, and N.

Figure 8:
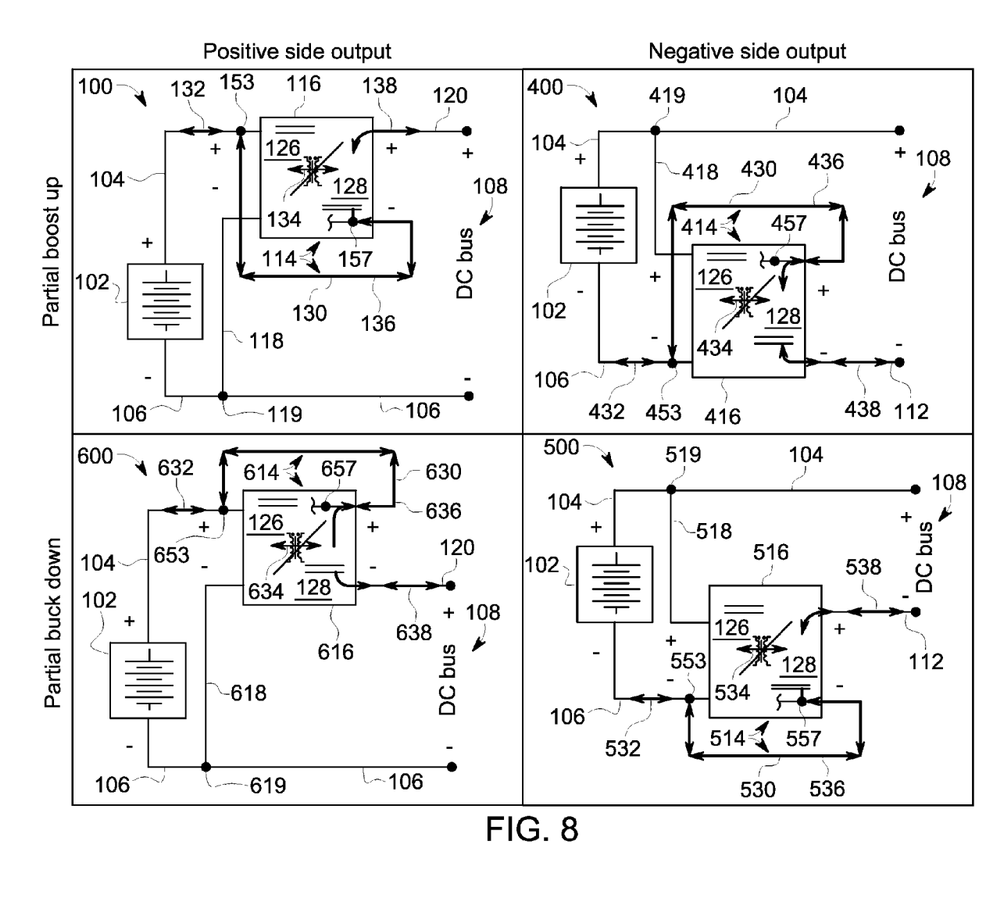
FIG. 8 is a schematic view of a comparison of the DC power system shown in FIG. 1 and three alternative embodiments of DC power systems.

FIG. 8 is a schematic view of a comparison of DC power system 100 and three alternative embodiments of DC power systems. DC power system 100 is a partial boost up configuration (as described above) with a positive output leg connection (as described above). Bi-directional current flows 132, 134, 136 and 138 are shown.

DC power system 400 is a partial boost up configuration (as described above) with a negative output leg connection (described further below). DC power system 400 includes rechargeable battery system 102, first positive DC conductor 104, first negative DC conductor 106, and DC bus system 108. DC power system 400 also includes an alternative converter system 414 that includes an alternative power converter 416. Power converter 416 is coupled to battery system 102 through first positive DC conductor 104, a positive terminal 419, and second positive DC conductor 418 and first negative DC conductor 106 at a negative terminal 453. Power converter 416 includes a positive terminal 457. Converter system 414 includes an alternative augmenting conductor 430 that extends from negative terminal 453 to positive terminal 457.

In operation, when battery system 102 is discharging and supplying power to DC bus system 108 through first positive DC conductor 104, switching devices 144 in second bridge circuit 128 (both shown in FIG. 2) are held open through control system 140 (shown in FIG. 2). In some embodiments, second switching devices 144 are either closed or switched to facilitate current flow through second bridge circuit 128 by bypassing diodes 144. Also, switching devices 142 in first bridge circuit 126 (both shown in FIG. 2) are either closed or switched under control of control system 140. Return DC bus current 438 is transmitted from DC bus system 108 to converter system 414 and current 438 is divided at second bridge circuit 128 into power converter current 434 and augmenting current 436. Augmenting current 436 is transmitted through diodes 147 from second negative polarity conductor 156 (both shown in FIG. 2) to positive terminal 457 at second positive polarity conductor 154 (shown in FIG. 2). Augmenting current 436 bypasses first bridge circuit 126 through augmenting conductor 430. Specifically, augmenting current 436 is transmitted through augmenting conductor 430 from positive terminal 457 at second positive polarity conductor 154 to negative terminal 453 at first negative DC conductor 106.

In addition, power converter current 434 is transmitted from second bridge circuit 128 to first bridge circuit 126 through isolation transformer 148 (shown in FIG. 2). First switching devices 142 facilitate phase shifting of power converter current 434. The output voltage at negative terminal 453 is the sum of voltages from converted output, i.e., the voltage induced by first bridge circuit 126 and isolation transformer 148, and the voltage induced through augmenting conductor 430. In addition, power converter current 434 and augmenting current 436 are summed at negative terminal 453, where most of the power associated with DC bus current 438 is transmitted through augmenting conductor 430. Therefore, augmenting current 436 augments power converter current 434. Since, during battery discharging operation, augmenting current 436 and power converter current 434 as well as the voltage induced by second bridge circuit 128 onto first bridge circuit 126 and the voltage induced through augmenting conductor 430 are summed at negative terminal 453, a power converter negative polarity output transmission path between DC bus system 108 and battery system 102 is defined. As such, a negative output leg connection with respect to second bridge circuit 128 is defined.

Battery current 432 is further transmitted to battery system 102 through first negative DC conductor 106. During such discharging operation of battery system 102, converted power, i.e., power converter current 434 provides the small boost of voltage to close the difference between battery voltage and converter output voltage. Therefore, power converter 416 only transmits a small portion of power to boost the voltage up to the difference between battery system 102 and negative bus 112. If battery voltage and converter output voltage are substantially similar, little to no current is transmitted through power converter 416 and substantially all power is transmitted through augmenting conductor 430. As such, power converter 416 does not need to be sized to carry the full return current 438/432 transmitted from DC bus system 108 to battery system 102.

Further, in operation, when battery system 102 is charging through DC bus system 108, switching devices 144 in second bridge circuit 128 are closed through control system 140. In some embodiments, second switching devices 144 are switched to facilitate current flow through second bridge circuit 128. Also, switching devices 142 in first bridge circuit 126 are either closed or switched under control of 140. Battery current 432 is transmitted from battery system 102 to converter system 414 and current 432 is divided at negative terminal 453 into power converter current 434 and augmenting current 436. Augmenting current 436 bypasses first bridge circuit 126 through augmenting conductor 430. Specifically, augmenting current 436 is transmitted through augmenting conductor 430 as current 436 is transmitted from first negative DC conductor 106 through negative terminal 453 to first positive polarity conductor 150 through positive terminal 457.

In addition, power converter current 434 is transmitted from first negative polarity conductor 152 through first switching devices 142 of first bridge circuit 126 to second bridge circuit 128 through isolation transformer 148. Either first switching devices 142 or second switching devices 144 facilitate phase shifting of power converter current 434. Some current 134 may transmit through diodes 146.

The output voltage at second negative polarity conductor 156 is the sum of voltages from converted output, i.e., the voltage induced by second bridge circuit 128 and the voltage induced through augmenting conductor 430. In addition, power converter current 434 and augmenting current 436 are summed at second negative polarity conductor 156, where most of the power associated with DC bus 438 is transmitted through augmenting conductor 430. Therefore, augmenting current 436 augments power converter current 434. Since, during battery charging operation, augmenting current 436 and power converter current 434 as well as the voltage induced by second bridge circuit 128 and the voltage induced through augmenting conductor 430 are summed at second negative polarity conductor 156, a power converter negative polarity output transmission path between battery system 102 and DC bus system 108 is defined. As such, a negative output leg connection with respect to second bridge circuit 128 is defined.

DC bus system current 438 is further transmitted to DC bus system 108. During such charging operation of battery system 102, converted power, i.e., power converter current 434 provides the small boost of voltage to close the difference between DC bus system and converter output voltage. Therefore, power converter 416 only transmits a small portion of power to boost the voltage up to the difference between positive terminal 457 and negative bus 112. If battery voltage and converter output voltage are substantially similar, little to no current is transmitted through power converter 416 and substantially all power is transmitted through augmenting conductor 430. As such, power converter 416 does not need to be sized to carry the full current draw by DC bus system 108 from battery system 102. As such, converter system 414 is configured to facilitate feed-forward bypass current transmission and small boosting during both charging and discharging operations.

DC power system 500 is a partial buck down configuration (as described further below) with a negative output leg connection (described above). DC power system 500 includes rechargeable battery system 102, first positive DC conductor 104, first negative DC conductor 106, and DC bus system 108. DC power system 500 also includes an alternative converter system 514 that includes an alternative power converter 516. Power converter 516 is coupled to battery system 102 through first positive DC conductor 104, a positive terminal 519, and second positive DC conductor 518 and first negative DC conductor 106 at a negative terminal 553. Power converter 516 includes a negative terminal 557. Converter system 514 includes an alternative augmenting conductor 530 that extends from negative terminal 553 to positive terminal 557.

In operation, when battery system 102 is discharging and supplying power to DC bus system 108 through first positive DC conductor 104, switching devices 144 in second bridge circuit 128 (both shown in FIG. 2) are closed through control system 140 (shown in FIG. 2). In some embodiments, second switching devices 144 are switched to facilitate current flow through second bridge circuit 128. Also, switching devices 142 in first bridge circuit 126 (both shown in FIG. 2) are either closed or switched under control of control system 140. Return DC bus current 538 is transmitted from DC bus system 108 to converter system 514 and current 538 is divided at second bridge circuit 128 into power converter current 534 and augmenting current 536. Augmenting current 536 is transmitted through second switching devices 144 from second positive polarity conductor 154 (both shown in FIG. 2) to negative terminal 557 at second negative polarity conductor 156 (shown in FIG. 2). Augmenting current 536 bypasses first bridge circuit 126 through augmenting conductor 530. Specifically, augmenting current 536 is transmitted through augmenting conductor 530 from negative terminal 557 at second negative polarity conductor 156 to negative terminal 553 at first negative DC conductor 106.

In addition, power converter current 534 is transmitted from second bridge circuit 128 to first bridge circuit 126 through isolation transformer 148 (shown in FIG. 2). First switching devices 142 facilitate phase shifting of power converter current 534. The output voltage at negative terminal 553 is the sum of voltages from converted output, i.e., the voltage induced by first bridge circuit 126 and isolation transformer 148, and the voltage induced through augmenting conductor 530. In addition, power converter current 534 and augmenting current 536 are summed at negative terminal 553, where most of the power associated with DC bus current 538 is transmitted through augmenting conductor 530. Therefore, augmenting current 536 augments power converter current 534. Since, during battery discharging operation, augmenting current 536 and power converter current 534 as well as the voltage induced by second bridge circuit 128 onto first bridge circuit 126 and the voltage induced through augmenting conductor 530 are summed at negative terminal 553, a power converter negative polarity output transmission path between DC bus system 108 and battery system 102 is defined. As such, a negative output leg connection with respect to second bridge circuit 128 is defined.

Battery current 532 is further transmitted to battery system 102 through first negative DC conductor 106. During such discharging operation of battery system 102, converted power, i.e., power converter current 534 provides the small buck of voltage to close the difference between battery voltage and converter output voltage. Therefore, power converter 516 only transmits a small portion of power to buck the voltage down to the difference between battery system 102 and negative bus 112. If battery voltage and converter output voltage are substantially similar, little to no current is transmitted through power converter 516 and substantially all power is transmitted through augmenting conductor 530. As such, power converter 516 does not need to be sized to carry the full return current 538/532 transmitted from DC bus system 108 to battery system 102.

Further, in operation, when battery system 102 is charging through DC bus system 108, switching devices 144 in second bridge circuit 128 are held open through control system 140. In some embodiments, second switching devices 144 are either closed or switched to facilitate current flow through second bridge circuit 128 by bypassing diodes 144. Also, switching devices 142 in first bridge circuit 126 are either closed or switched under control of 140. Battery current 532 is transmitted from battery system 102 to converter system 514 and current 532 is divided at negative terminal 553 into power converter current 534 and augmenting current 536. Augmenting current 536 bypasses first bridge circuit 126 through augmenting conductor 530. Specifically, augmenting current 536 is transmitted through augmenting conductor 530 as current 536 is transmitted from first negative DC conductor 106 through negative terminal 553 to second negative polarity conductor 156 through negative terminal 557.

In addition, power converter current 534 is transmitted from first negative polarity conductor 152 through first switching devices 142 of first bridge circuit 126 to second bridge circuit 128 through isolation transformer 148. Either first switching devices 142 or second switching devices 144 facilitate phase shifting of power converter current 534. Some current 534 may transmit through diodes 146.

The output voltage at negative bus 112 is the sum of voltages from converted output, i.e., the voltage induced by second bridge circuit 128 and the voltage induced through augmenting conductor 530. In addition, power converter current 534 and augmenting current 536 are summed at negative bus 112, where most of the power associated with DC bus 538 is transmitted through augmenting conductor 530. Therefore, augmenting current 536 augments power converter current 534. Since, during battery charging operation, augmenting current 536 and power converter current 534 as well as the voltage induced by second bridge circuit 128 and the voltage induced through augmenting conductor 530 are summed at negative bus 112, a power converter negative polarity output transmission path between battery system 102 and DC bus system 108 is defined. As such, a negative output leg connection with respect to second bridge circuit 128 is defined.

DC bus system current 538 is further transmitted to DC bus system 108. During such charging operation of battery system 102, converted power, i.e., power converter current 534 provides the small buck of voltage to close the difference between DC bus system and converter output voltage. Therefore, power converter 516 only transmits a small portion of power to buck the voltage down to the difference between battery system 102 and negative bus 112. If battery voltage and converter output voltage are substantially similar, little to no current is transmitted through power converter 516 and substantially all power is transmitted through augmenting conductor 530. As such, power converter 516 does not need to be sized to carry the full current draw by DC bus system 108 from battery system 102. As such, converter system 514 is configured to facilitate feed-forward bypass current transmission and small bucking during both charging and discharging operations.

DC power system 600 is a partial buck down configuration (as described above) with a positive output leg connection (described above). DC power system 600 includes rechargeable battery system 102, first positive DC conductor 104, first negative DC conductor 106, and DC bus system 108. DC power system 600 also includes an alternative converter system 614 that includes an alternative power converter 616. Power converter 616 is coupled to battery system 102 through first positive DC conductor 104, a positive terminal 653, and second negative DC conductor 518 and first negative DC conductor 106 at a negative terminal 619. Power converter 616 includes a positive terminal 657. Converter system 614 includes an alternative augmenting conductor 630 that extends from positive terminal 653 to positive terminal 657.

In operation, when battery system 102 is discharging and supplying power to DC bus system 108 through first positive DC conductor 104, switching devices 144 in second bridge circuit 128 (both shown in FIG. 2) are closed through control system 140 (shown in FIG. 2). In some embodiments, second switching devices 144 are switched to facilitate current flow through second bridge circuit 128. Also, switching devices 142 in first bridge circuit 126 (both shown in FIG. 2) are either closed or switched under control of control system 140. DC bus current 638 is transmitted from converter system 614 to DC bus system 108. Battery current 632 is divided at positive terminal 653 into power converter current 634 and augmenting current 636. Augmenting current 636 is transmitted through second switching devices 144 from positive terminal 657 (both shown in FIG. 2) to second positive DC conductor 120 through second negative polarity conductor 156 (shown in FIG. 2). Augmenting current 636 bypasses first bridge circuit 126 through augmenting conductor 630. Specifically, augmenting current 636 is transmitted through augmenting conductor 630 from positive terminal 653 at first positive DC conductor 104 second negative polarity conductor 156 to positive terminal 657 at second positive polarity conductor 154.

In addition, power converter current 634 is transmitted from first bridge circuit 126 to second bridge circuit 128 through isolation transformer 148 (shown in FIG. 2). First switching devices 142 facilitate phase shifting of power converter current 634. The output voltage at second bridge circuit 128 is the sum of voltages from converted output, i.e., the voltage induced by first bridge circuit 126 and isolation transformer 148, and the voltage induced through augmenting conductor 630. In addition, power converter current 634 and augmenting current 636 are summed within second bridge circuit 128, where most of the power associated with DC bus current 638 is transmitted through augmenting conductor 630. Therefore, augmenting current 636 augments power converter current 634. Since, during battery discharging operation, augmenting current 636 and power converter current 634 as well as the voltage induced by first bridge circuit 126 onto second bridge circuit 128 and the voltage induced through augmenting conductor 630 are summed at second negative polarity conductor 156, a power converter positive polarity output transmission path between battery system 102 and DC bus system 108 is defined. As such, a positive output leg connection with respect to second bridge circuit 128 is defined.

DC bus current 138 is further transmitted to second positive DC conductor 120 and DC bus system 108. During such discharging operation of battery system 102, converted power, i.e., power converter current 634 provides the small boost of voltage to close the difference between battery voltage and converter output voltage. Therefore, power converter 616 only transmits a small portion of power to boost the voltage up to the difference between battery system 102 and second positive DC conductor 120. If battery voltage and converter output voltage are substantially similar, little to no current is transmitted through power converter 616 and substantially all power is transmitted through augmenting conductor 630. As such, power converter 616 does not need to be sized to carry the full current draw by DC bus system 108 from battery system 102.

Further, in operation, when battery system 102 is charging through DC bus system 108, switching devices 144 in second bridge circuit 128 are held open through control system 140. In some embodiments, second switching devices 144 are either closed or switched to facilitate current flow through second bridge circuit 128 by bypassing diodes 144. Also, switching devices 142 in first bridge circuit 126 are either closed or switched under control of 140. DC bus current 638 is transmitted from DC bus system 108 to converter system 614 and current 638 is divided within second bridge circuit 128 into power converter current 634 and augmenting current 636. Augmenting current 636 is transmitted through diodes 147 from second negative polarity conductor 156 (both shown in FIG. 2) to positive terminal 657 at second positive polarity conductor 154 (shown in FIG. 2). Augmenting current 636 bypasses first bridge circuit 126 through augmenting conductor 630. Specifically, augmenting current 636 is transmitted through augmenting conductor 630 as current 636 is transmitted from second positive polarity conductor 154 through positive terminal 657 to first positive DC conductor 104 through positive terminal 653.

In addition, power converter current 634 is transmitted from second bridge circuit 128 to first bridge circuit 126 through isolation transformer 148. Either first switching devices 142 or second switching devices 144 facilitate phase shifting of power converter current 634. Some current 634 may transmit through diodes 146.

The output voltage at first positive polarity conductor 150 is the sum of voltages from converted output, i.e., the voltage induced by first bridge circuit 126 and the voltage induced through augmenting conductor 630. In addition, power converter current 634 and augmenting current 636 are summed at positive terminal 653, where most of the power associated with battery current 632 is transmitted through augmenting conductor 630. Therefore, augmenting current 636 augments power converter current 634. Since, during battery charging operation, augmenting current 636 and power converter current 634 as well as the voltage induced by first bridge circuit 126 and the voltage induced through augmenting conductor 630 are summed at first positive polarity conductor 150, a power converter positive polarity output transmission path between DC bus system 108 and battery system 102 is defined. As such, a positive output leg connection with respect to second bridge circuit 128 is defined.

Battery current 132 is further transmitted to first positive DC conductor 104 and battery system 102. During such charging operation of battery system 102, converted power, i.e., power converter current 634 provides the small boost of voltage to close the difference between battery voltage and converter output voltage. Therefore, power converter 616 only transmits a small portion of power to boost the voltage up to the difference between battery system 102 and first positive DC conductor 104. If battery voltage and converter output voltage are substantially similar, little to no current is transmitted through power converter 616 and substantially all power is transmitted through augmenting conductor 630. As such, power converter 616 does not need to be sized to carry the full current draw by battery system 102 from DC bus system 108. As such, converter system 614 is configured to facilitate feed-forward bypass current transmission and small boosting during both charging and discharging operations.

The above-described direct current (DC) power systems facilitate use of more efficient and cheaper power converters with a smaller footprint. Specifically, the power converters described herein facilitate converting only a fraction of the electric power transferred between a battery and a DC bus and facilitating the majority of the power to bypass the power converter. Therefore, the size of the converters is reduced and lower power losses due to decreased power that is actually converted result in a greater efficiency. In addition, the DC power systems described herein include power converters that overcome issues associated with dissimilar batteries in multiple parallel-connected battery strings that are dissimilar due to ageing, battery cell failures and jumping, different vendors, models, and ratings. As such, each string will behave less differently from the other strings. Furthermore, each of the individual power converters are integrated into a common battery management system, thereby further facilitating decreasing aggregated installation costs.

An exemplary technical effect of the methods, systems, and apparatus described herein includes at least one of: (a) facilitating use of dissimilar batteries in multiple parallel-connected battery strings; (b) decreasing size and cost of power converters between batteries and DC buses in DC power systems; and (c) increasing the efficiency of power transfer between batteries and DC buses in DC power systems.

Exemplary embodiments of methods, systems, and apparatus for DC power systems are not limited to the specific embodiments described herein, but rather, components of systems and/or steps of the methods may be utilized independently and separately from other components and/or steps described herein. For example, the methods, systems, and apparatus may also be used in combination with other systems requiring DC-to-DC power conversion, and the associated methods, and are not limited to practice with only the systems and methods as described herein. Rather, the exemplary embodiment can be implemented and utilized in connection with many other applications, equipment, and systems that may benefit from using partial power DC-to-DC power converters in DC power systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A converter system comprising:
   a power converter comprising:
   a first bridge circuit comprising at least one first switching device;
   a second bridge circuit magnetically coupled to said first bridge circuit, said second bridge circuit comprising at least one second switching device;
   a plurality of first conductors of opposing polarities coupled to said first bridge circuit; and
   a plurality of second conductors of opposing polarities, wherein at least one second conductor of said plurality of second conductors is coupled to said second bridge circuit; and
   a third conductor coupled to one first conductor of said plurality of first conductors and coupled to said second bridge circuit.

2. The converter system in accordance with claim 1, wherein said power converter is a bi-directional direct current (DC)-to-DC converter.

3. The converter system in accordance with claim 1, wherein said converter system is a bi-directional partial power bridge system configured to regulate power transmission therethrough by regulating phase shifting between said first bridge circuit and said second bridge circuit.

4. The converter system in accordance with claim 3, wherein said bi-directional partial power bridge system comprises one of a dual-active bridge topology, an H-bridge topology, a half-bridge topology, a single-ended primary-inductor topology, and a Cuk topology.

5. The converter system in accordance with claim 1 further comprising an isolation transformer, wherein said first bridge circuit and said second bridge circuit are magnetically coupled to each other through said isolation transformer.

6. The converter system in accordance with claim 5 further comprising a resonant tank circuit coupled to said first bridge circuit and said isolation transformer.

7. The converter system in accordance with claim 1 further comprising an output inductor coupled to said second bridge circuit.

8. The converter system in accordance with claim 1, wherein said power converter is configured to transmit a first current and said third conductor is configured to transmit a second current greater than the first current.

9. The converter system in accordance with claim 1, wherein said plurality of first conductors of opposing polarities comprises a first positive polarity conductor and said plurality of second conductors of opposing polarities comprises a second positive polarity conductor, said third conductor coupled to said first positive polarity conductor.

10. The converter system in accordance with claim 9, wherein said plurality of first conductors of opposing polarities further comprises a first negative polarity conductor and said plurality of second conductors of opposing polarities further comprises a second negative polarity conductor, said third conductor further coupled to said second negative polarity conductor.

11. The converter system in accordance with claim 9, wherein said third conductor is further coupled to said second positive polarity conductor.

12. The converter system in accordance with claim 1, wherein said plurality of first conductors of opposing polarities comprises a first negative polarity conductor and said plurality of second conductors of opposing polarities comprises a second negative polarity conductor, said third conductor coupled to said first negative polarity conductor.

13. The converter system in accordance with claim 12, wherein said plurality of first conductors of opposing polarities further comprises a first positive polarity conductor and said plurality of second conductors of opposing polarities further comprises a second positive polarity conductor, said third conductor further coupled to said second positive polarity conductor.

14. The converter system in accordance with claim 12, wherein said third conductor is further coupled to said second negative polarity conductor.

15. A direct current (DC) electrical power system comprising:
   a plurality of rechargeable DC storage devices; and
   a plurality of DC-to-DC converter systems, each DC-to-DC converter system of said plurality of DC-to-DC converter systems coupled to a respective rechargeable DC storage device of said plurality of rechargeable DC storage devices, said each DC-to-DC converter system comprises:
      a DC-to-DC converter comprising:
         a first bridge circuit comprising at least one first switching device;
         a second bridge circuit magnetically coupled to said first bridge circuit, said second bridge circuit comprising at least one second switching device;
         a plurality of first conductors of opposing polarities coupled to said first bridge circuit; and
         a plurality of second conductors of opposing polarities, wherein at least one second conductor of said plurality of second conductors is coupled to said second bridge circuit; and
      a third conductor coupled to one first conductor of said plurality of first conductors and coupled to said second bridge circuit.

16. The DC electrical power system in accordance with claim 15, wherein said plurality of rechargeable DC storage devices comprises a plurality of rechargeable DC storage batteries.

17. The DC electrical power system in accordance with claim 16, wherein each rechargeable DC storage battery of said plurality of rechargeable DC storage batteries comprises a plurality of rechargeable electrochemical cells electrically isolated from each other.

18. The DC electrical power system in accordance with claim 17, wherein said plurality of rechargeable electrochemical cells are coupled electrically in at least one of series, parallel, and a combination of series and parallel.

19. The DC electrical power system in accordance with claim 16, wherein at least one rechargeable electrochemical cell of said plurality of rechargeable electrochemical cells is a sodium metal halide cell.

20. The DC electrical power system in accordance with claim 16, wherein a first portion of said plurality of rechargeable electrochemical cells has at least one characteristic rating value different from a characteristic rating value of a second portion of said plurality of rechargeable electrochemical cells.

21. The DC electrical power system in accordance with claim 15 further comprising an isolation transformer and a resonant tank circuit, wherein:
   said first bridge circuit and said second bridge circuit are magnetically coupled to each other through said isolation transformer; and
   said resonant tank circuit coupled to said first bridge circuit and said isolation transformer.

22. The DC electrical power system in accordance with claim 15, wherein said DC-to-DC converter is configured to transmit a first current and said third conductor is configured to transmit a second current greater than the first current.

23. A method of operating a direct current (DC) electrical power system, said method comprising:
   transmitting a first portion of electric power between a rechargeable DC storage battery and a DC bus through a DC-to-DC converter, the DC-to-DC converter including a first bridge circuit and a second bridge circuit magnetically coupled to the first bridge circuit, thereby converting the first portion of electric power; and
   transmitting a second portion of electric power between a first electrically conductive element extending between the rechargeable DC storage battery and the first bridge circuit to the second bridge circuit through a second electrically conductive element, thereby augmenting the converted first portion of electric power with the non-converted second portion of electric power.

24. The method in accordance with claim 23, wherein transmitting a first portion of electric power and transmitting a second portion of electric power comprises bi-directional power transmission including one of discharging the rechargeable DC storage battery and recharging the rechargeable DC storage battery.

25. The method in accordance with claim 23, wherein the DC electrical power system includes a plurality of rechargeable DC storage batteries and a plurality of DC-to-DC converters, each rechargeable DC storage battery of the plurality of rechargeable DC storage batteries and each DC-to-DC converter of the plurality of DC-to-DC converters define a battery and power conversion string, said transmitting a first portion of electric power and transmitting a second portion of electric power comprises regulating voltage in a first a battery and power conversion string to a first voltage value and regulating voltage in a second battery and power conversion string to a second voltage value different from the first voltage value.

26. The method in accordance with claim 23, wherein the DC electrical power system includes a plurality of rechargeable DC storage batteries and a plurality of DC-to-DC converters, each rechargeable DC storage battery of the plurality of rechargeable DC storage batteries and each DC-to-DC converter of the plurality of DC-to-DC converters define a battery and power conversion string, said transmitting a first portion of electric power and transmitting a second portion of electric power comprises regulating current transmission in a first a battery and power conversion string to a first current value and regulating current transmission in a second battery and power conversion string to a second current value, the second current value one of substantially similar to and different from the first current value.

27. The method in accordance with claim 23, wherein the first bridge circuit includes a plurality of first switches and the second bridge circuit includes a plurality of second switches, wherein transmitting a first portion of electric power and transmitting a second portion of electric power comprises opening and holding open one of the plurality of first switches and the plurality of second switches and performing switching operations through one of the plurality of second switches and the plurality of first switches.

* * * * *